United States Patent Office 3,056,597
Patented Oct. 2, 1962

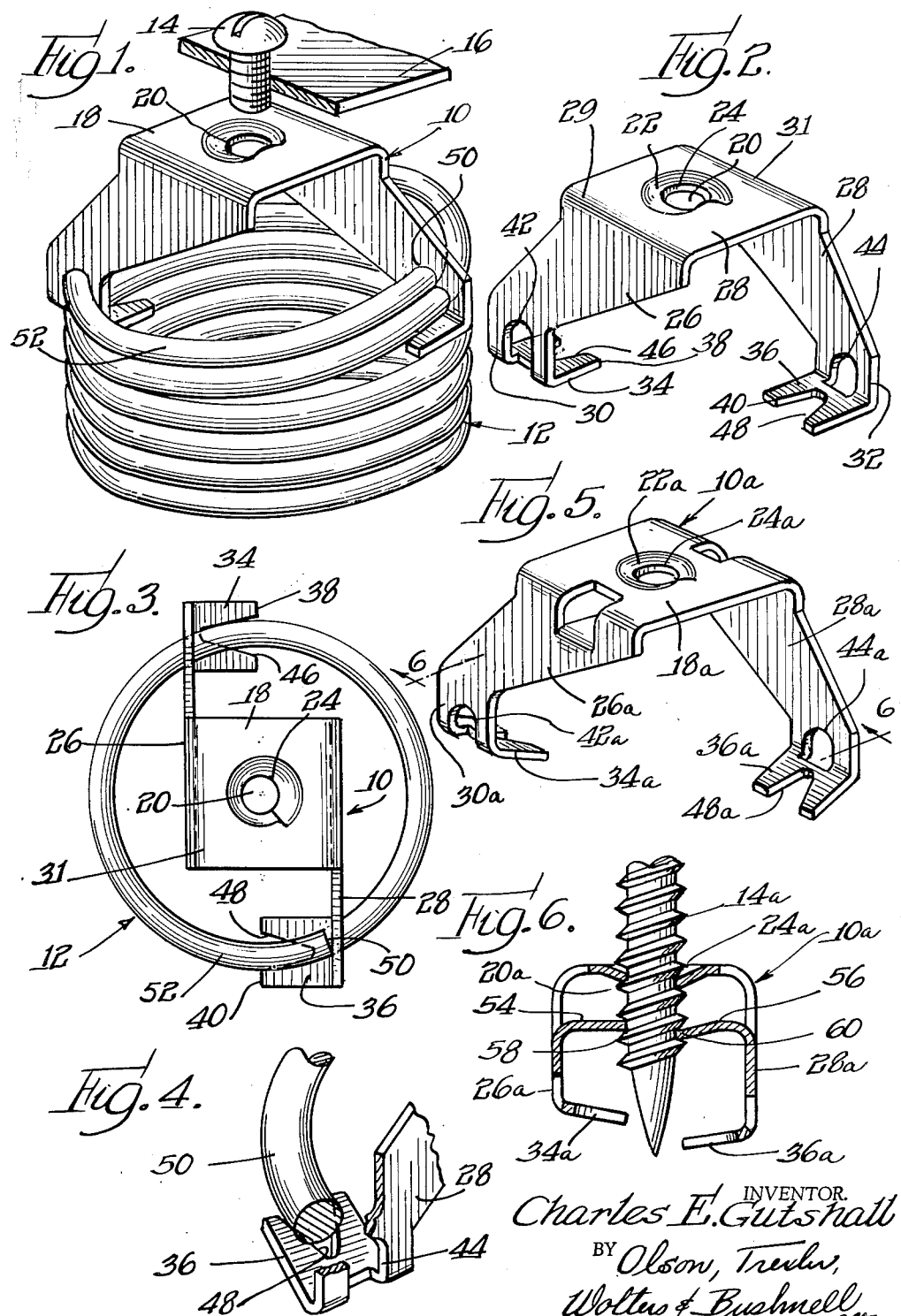

3,056,597
RETAINER
Charles E. Gutshall, Prospect, Conn., assignor to Illinois Tool Works, Inc., a corporation of Delaware
Filed June 6, 1961, Ser. No. 115,185
6 Claims. (Cl. 267—1)

The present invention relates to a novel combined nut and retainer member and more specifically to a novel device for securing and retaining an article such as a helically coiled spring.

An important object of the present invention is to provide a novel device of simple and economical construction whereby a helically coiled spring or similar article may be mounted and securely retained in position.

A more specific object of the present invention is to provide a novel device of the above described type which may be readily secured to a complementary support structure by means of a screw or similar fastener member.

A further object of the present invention is to provide a novel device of the above described type which is adapted to be easily and securely applied to an end of an article such as a helically coiled spring in a direction extending axially of the spring.

Another specific object of the present invention is to provide a novel device of the above described type which is of one piece construction.

Other objects and advantages of the present invention will become apparent from the following description and the accompanying drawings wherein:

FIG. 1 is a partially exploded perspective view showing an assembly including a combined retainer and nut member incorporating features of the present invention;

FIG. 2 is a perspective view of the novel device or combined retainer and nut member shown in the assembly of FIG. 1;

FIG. 3 is a plan view showing the novel device applied to a coil spring;

FIG. 4 is a fragmentary perspective view showing a portion of the structure in greater detail;

FIG. 5 is a perspective view showing a modified embodiment of the present invention; and FIG. 6 is a sectional view taken generally along 6—6 in FIG. 5 and further shows a screw member assembled with the combined nut and retaining device.

Referring now more specifically to the drawings wherein like parts are designated by the same numerals throughout the various figures, a nut and retaining device 10 incorporating features of the present invention is shown in FIGS. 1 through 4. The device 10 is formed from a single piece of sheet material, preferably sheet steel, and is adapted to be assembled with a coiled spring 12 and with a complementary fastener element or screw 14 for securing the spring with respect to an apertured support member 16. As will be understood, the apertured support member 16 may form a part of numerous different installations. By way of example only, it is contemplated that the member 16 may be a frame or bracket element in a washing machine in which the coiled spring serves as a part of a resilient mounting for the washing machine barrel, not shown.

The device 10 includes a central body portion 18 having an aperture 20 therethrough. An internal marginal portion 22 of the body which defines the aperture 20 is formed so as to provide helical thread means 24 cooperable with the helical threads of the screw or fastener element 14. In the embodiment shown, the internal marginal portion 22 is helically deflected out of the plane of the generally flat body 18 so as to provide the helical thread convolution 24, but it is to be understood that the specific construction of the marginal portion 22 and the thread convolution 24 may be varied as desired.

Side or wing sections 26 and 28 are integrally joined to opposite side margins 29 and 31 of the body 18. These sections 26 and 28 extend transversely with respect to the plane of the body 18 and are preferably disposed in planes substantially perpendicular to the body 18. Outer end portions 30 and 32 of the sections 26 and 28 are offset oppositely from the central axis of the apertured body 18 and from each other a distance at least substantially equal to the diameter of the coil spring 12 with which the device is to be assembled.

The outer ends of the sections 26 and 28, or in other words, the ends farthest away from the body 18, respectively merge with sections 34 and 36 extending laterally therefrom and generally in planes disposed transversely with respect to the central axis of the apertured body 18. The free or terminal end edges 38 and 40 of the sections 34 and 36 respectively are substantially located in a plane which also contains the central axis of the body 18 and aperture 20 as shown best in FIG. 3. In addition, the section 36 is spaced from the plane of the body 18 in a direction parallel to the central axis of the aperture 20 a distance greater than the corresponding spacing of the section 34 from the body. This greater spacing of the section 36 is approximately equal to one half of the axial extent of each helical coil of the spring 12. Thus, when the device 10 is assembled with the spring in the manner described below, the sections 34 and 36 are adapted to engage beneath diametrically opposite portions of a coil of the spring without unduly distorting the spring. In the device 10 shown for the purpose of illustrating one embodiment of the present invention, the end portions 30 and 32 of the sections 26 and 28 are respectively provided with apertures 42 and 44 therethrough for accommodating the wire of the spring 12 when the parts are assembled as shown in FIG. 1. In addition, generally V-shaped notches 46 and 48 are provided in the sections 34 and 36 generally in alignment with the apertures 42 and 44. The width of the apertures is greater than the diameter of the wire which forms the spring 12 and the greatest width of the notches 46 and 48 is at the terminal edges 38 and 40 of the sections 34 and 36 and is preferably similar to the diameter of the spring wire.

In order to assemble the parts described above, the retainer 10 and spring 12 are first positioned in substantially axial alignment with respect to each other whereupon the terminal end 50 of the endmost coil 52 of the spring 12 is inserted through the aperture 44 in the section 28. The retainer and spring are then rotated relative to each other so that the terminal end 50 is advanced over the laterally extending sections 34 and through the opening 42. Then the parts are preferably relatively rotated until the terminal end 50 engages an abutment surface provided by the side of the section 28. It is to be noted that during the initial phases of the assembly of the retainer with the spring, the edges of the V-shaped grooves 46 and 48 aid in guiding the end of the spring over the sections 34 and 36 and into the apertures 42 and 44. When the assembly between the retainer and the spring has been completed as shown in FIG. 1, the sections 34 and 36 are gripped between adjacent coils of the spring so that the corner edges of the V-shaped notches at the upper and lower side surfaces of the sections 34 and 36 engage the coils of the springs which are pressed against the opposite sides of the sections 34 and 36 so as to resist relative retrograde rotation between the retainer and the spring. After the nut and retainer member 10 has been assembled with the spring, it may be readily secured with respect to the support member 16 by the fastener or screw element 14.

FIGS. 5 and 6 show a modified form of the present invention which is similar to the structure described above as indicated by the application of identical reference numerals with the suffix *a* added to corresponding elements. One important difference in this structure is the provision of a plurality of axially spaced thread means on the member 10a for obtaining a stronger connection with the screw element 14a. In this embodiment, it is contemplated that thread means in addition to the helical thread convolution 24a be provided by striking fingers 54 and 56 from the sections 26a and 28a. The fingers 54 and 56 extend generally radially inwardly from the side sections 26a and 28a so as to position inner terminal end edges 58 and 60 thereof for combining with the thread convolution 24a in defining an elongated bore 20a for accommodating the screw element. The inner end edges 58 and 60 may be helically twisted so as to provide helical thread segments.

While the preferred embodiments of the present invention have been shown and described herein, it is obvious that many structural details may be changed without departing from the spirit and scope of the appended claims.

The invention is claimed as follows:

1. A one piece member of the type described for securing a coil spring with respect to a support structure, comprising a central body portion, means on said body portion cooperable with a complementary fastener element for securing said member with respect to said support structure, first and second sections respectively joined to generally opposite margins of said body portion and extending laterally from the same side of said body portion, and third and fourth sections respectively joined to said first and second sections and extending laterally therefrom for sliding between generally diametrically opposite portions of adjacent coils of said spring when the member is assembled with the spring, said third and fourth sections including notch means presenting edges for engaging a coil of the spring when said member is assembled with the spring for resisting loosening of the member from the spring.

2. A member, as defined in claim 1, wherein the notch means in each of said third and fourth sections is of generally V-shaped configuration.

3. A one piece sheet material member of the type described for securing a coil spring with respect to a support structure, comprising a generally planar body portion having generally centrally disposed aperture means extending axially therethrough, means defining said aperture means and providing helical thread means co-operable with a complementary fastener element for securing said member with respect to the support structure, first and second sections respectively joined to generally opposite margins of said body portion and projecting generally axially of said body portion in the same direction, and third and fourth sections repectively joined to said first and second sections and extending laterally therefrom and substantially in planes disposed transversely with respect to the axis of said aperture means for sliding between generally diametrically opposite portions of adjacent coils of the spring when said member is assembled with the spring, said first and second sections respectively including openings therein through which a coil of the spring may pass when the member is assembled with the spring.

4. A member, as defined in claim 3, wherein said third and fourth sections include oppositely facing terminal end edges substantially located in a plane containing the axis of said aperture means for facilitating entry of said last mentioned sections between adjacent coils of the spring during assembly of the member with the spring.

5. A member, as defined in claim 3, wherein said planes of said third and fourth sections are offset from each other axially of said body portion aperture means a distance approximately equal to one half of the lead of a helical coil of said coil spring.

6. A one piece member of the type described for securing a coil spring with respect to a support structure, comprising a generally planar body portion having generally centrally disposed aperture means extending axially therethrough, means defining said aperture means and providing helical thread means co-operable with a complementary fastener element for securing said member with respect to the support structure, first and second sections respectively joined to generally opposite margins of said body portion and projecting generally axially of said body portion in the same direction, and third and fourth sections respectively joined to said first and second sections and extending laterally therefrom and substantially in planes disposed transversely with respect to the axis of said aperture means for sliding between generally diametrically opposite portions of adjacent coils of the spring when said member is assembled with the spring, said means providing said helical thread means including a helically deflected inner margin of said body portion, and a plurality of elements struck from said first and second sections and projecting inwardly thereof.

References Cited in the file of this patent

UNITED STATES PATENTS

| | | |
|---|---|---|
| 964,651 | Kirk | July 19, 1910 |
| 1,558,471 | Bezkorowajnyj | June 15, 1926 |
| 1,931,651 | Ferris | Oct. 24, 1933 |